United States Patent [19]

Buchele et al.

[11] 4,141,419
[45] Feb. 27, 1979

[54] METHOD AND APPARATUS FOR CONTROLLING THE APPROACH ANGLE OF A PLOW UNIT IN RESPONSE TO SPEED VARIATIONS

[75] Inventors: Wesley F. Buchele; William I. Baldwin, both of Ames; James H. Eidet, Armstrong; Steven J. Marley, Ames, all of Iowa

[73] Assignee: Iowa State Univ. Research Foundation, Inc., Ames, Iowa

[21] Appl. No.: 779,674

[22] Filed: Mar. 21, 1977

[51] Int. Cl.² .................. A01B 61/00; A01B 65/02
[52] U.S. Cl. ........................................ 172/1; 172/2; 172/7; 172/285; 172/647
[58] Field of Search .............. 172/2, 3, 7, 8, 9, 10, 172/11, 12, 283, 287, 447, 477, 569, 576, 647, 742, 4, 4.5, 1, 285

[56] References Cited

U.S. PATENT DOCUMENTS

| 1,824,170 | 9/1931 | Ramstad | 172/647 |
| 2,326,097 | 8/1943 | Horner et al. | 172/647 |
| 3,094,693 | 6/1963 | Taylor | 172/2 X |
| 3,497,014 | 2/1970 | Ask | 172/4.5 |
| 3,817,333 | 6/1974 | Kinzenbaw | 172/283 |
| 3,957,121 | 5/1976 | Takeda | 172/4.5 |

FOREIGN PATENT DOCUMENTS

| 16518 | 2/1935 | Australia | 172/576 |
| 2315408 | 10/1974 | Fed. Rep. of Germany | 172/7 |
| 518171 | 8/1976 | U.S.S.R. | 172/647 |

Primary Examiner—Richard T. Stouffer
Attorney, Agent, or Firm—Rudolph L. Lowell

[57] ABSTRACT

A moldboard plow implement includes an elongated tool bar and several moldboard plow units, each plow unit including a plow bottom and a plow bottom support frame connected to the tool bar for pivotal movement about a pivot axis situated in vertical alignment with the point of the respective plow bottom. The plow units are pivotally moved in unison in response to the plowing speed to maintain the specific plow resistance constant for all tractor speeds.

4 Claims, 9 Drawing Figures

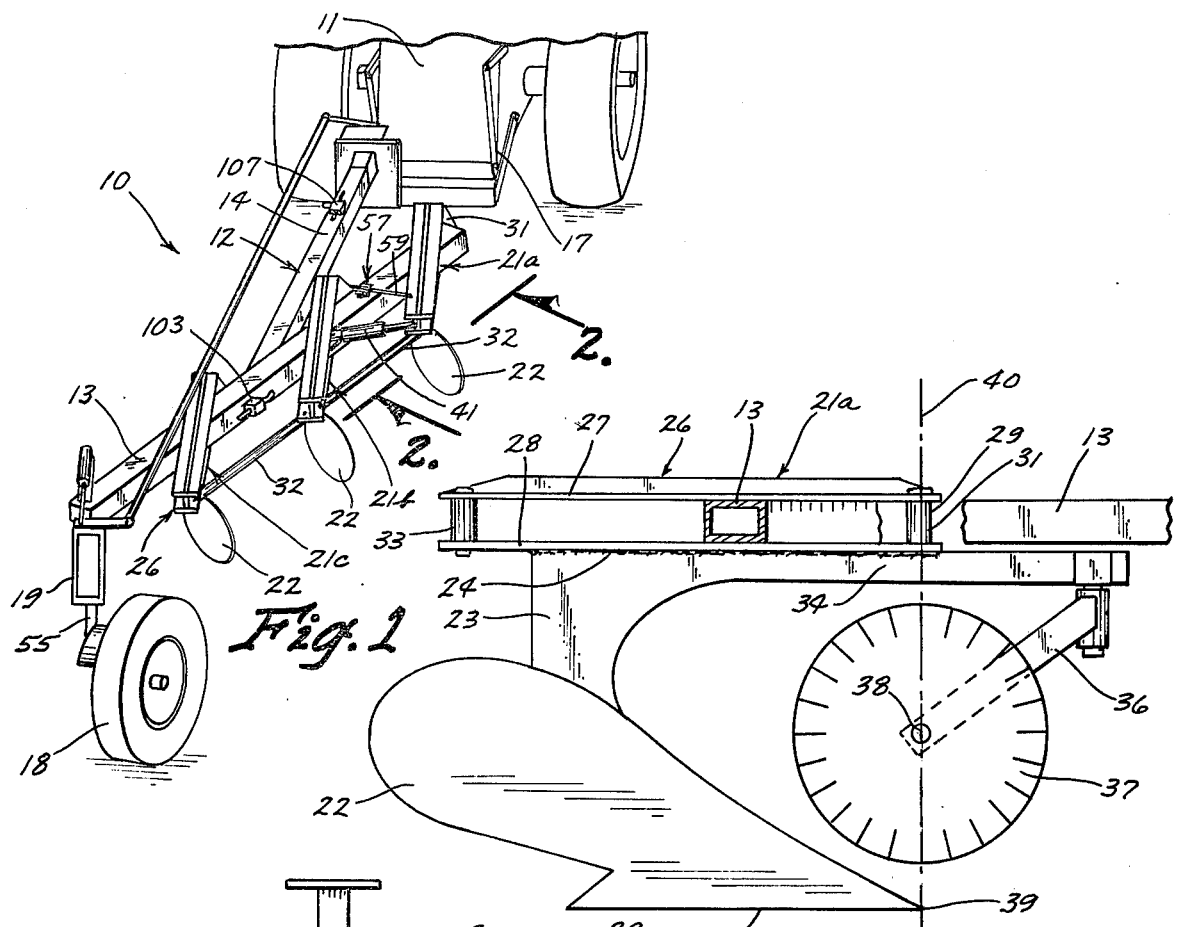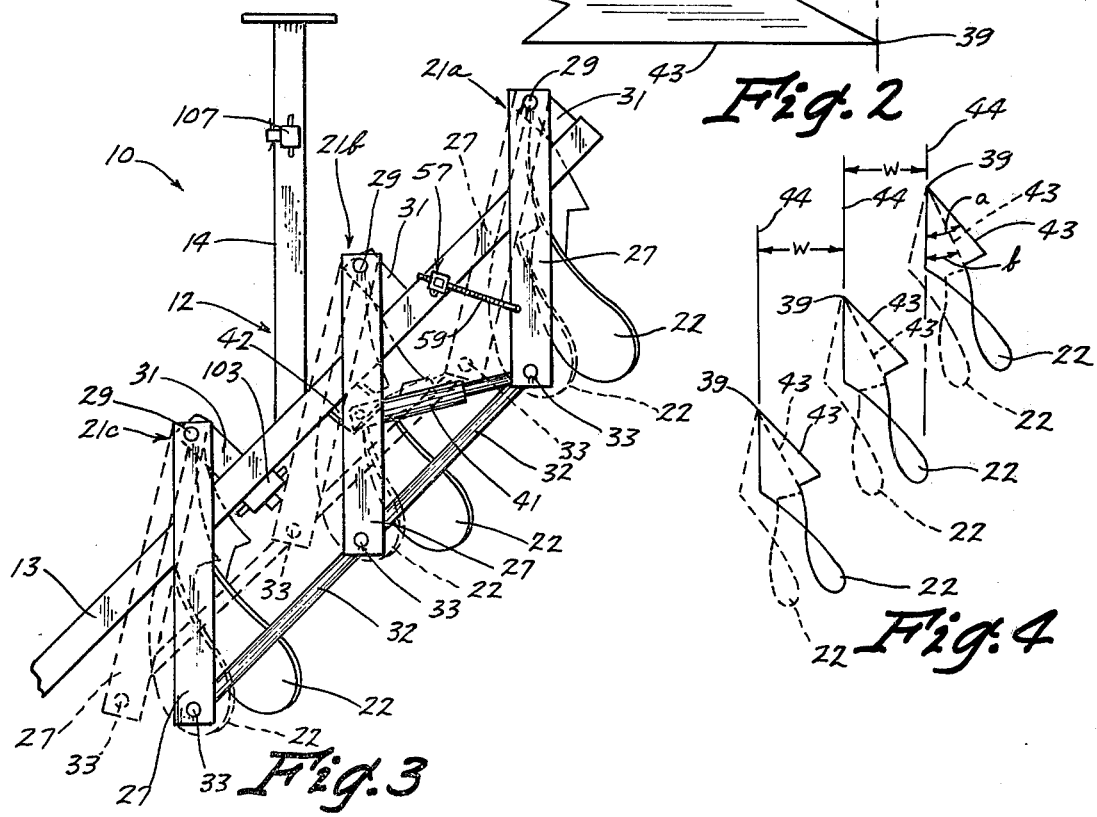

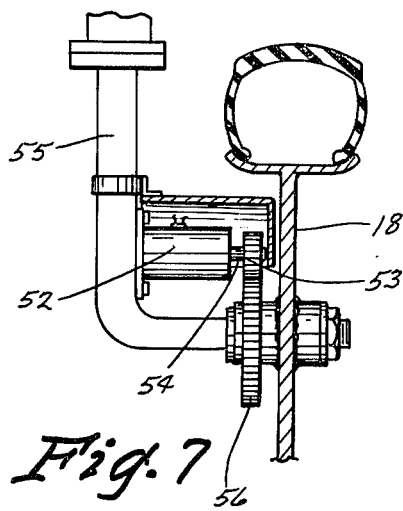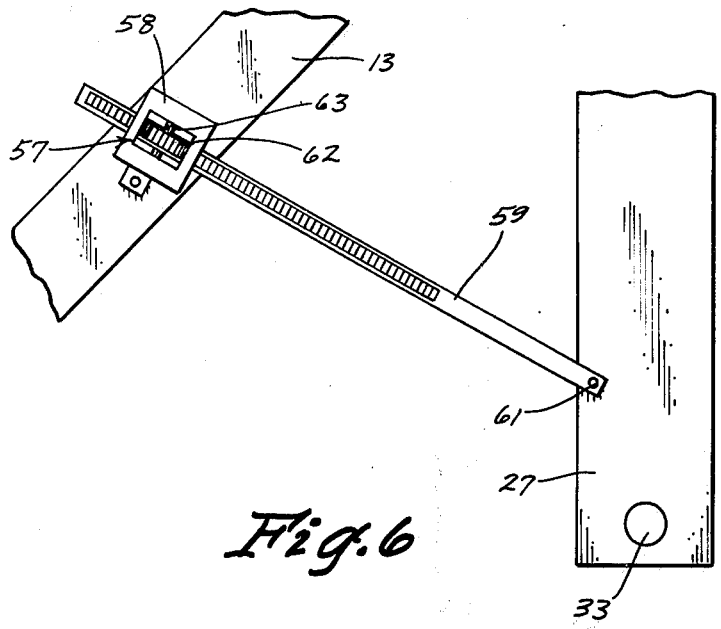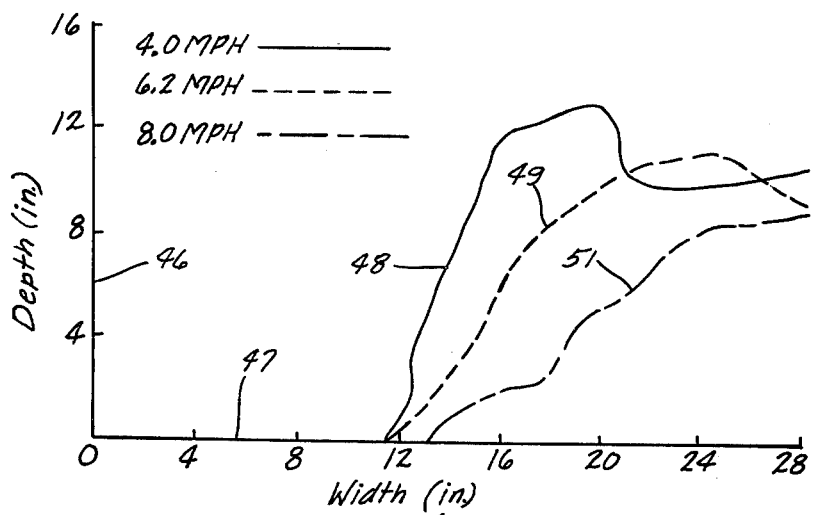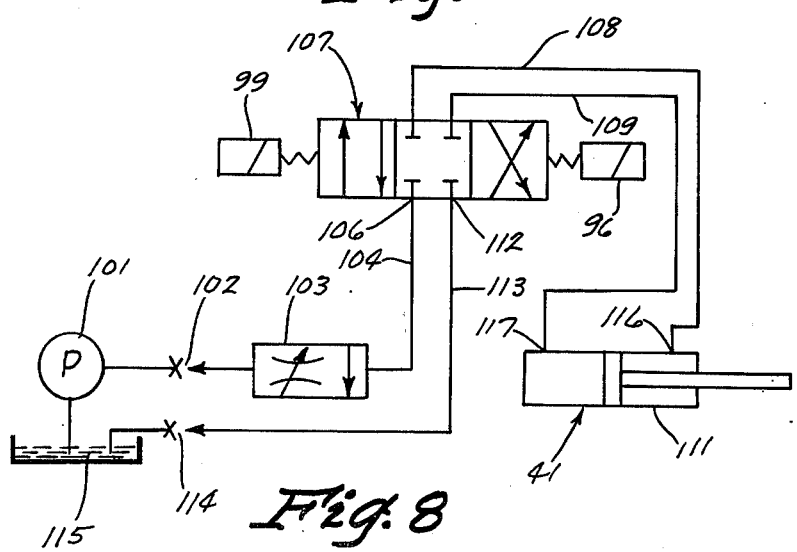

METHOD AND APPARATUS FOR CONTROLLING THE APPROACH ANGLE OF A PLOW UNIT IN RESPONSE TO SPEED VARIATIONS

SUMMARY OF THE INVENTION

The moldboard plow implement of the present invention provides for the automatic adjustment of the approach angle of the plow bottoms in response to changes in the speed of plowing whereby the draft force required to pull the plow and the shape of the furrows remain generally constant. Likewise, the furrow width remains constant for all approach angle settings of the plow bottoms since the vertical pivot axis for each plow unit is in vertical alignment with the point of the respective plow bottom. The combined electrohydraulic control system which automatically adjusts the approach angle of the plows in response to speed variations accomplishes a dual function, namely, to reduce the draft increase at higher speeds and, conversely, to increase the specific pressure on the plow bottoms at slower speeds where scouring may be a problem. The operator, therefore, need only manually adjust the approach angle for a desired speed on a first pass through the field to adjust the control system to accommodate particular soil conditions. The variable approach angle plow implement is readily adaptable for use with both small and large tractors.

BRIEF DESCRIPTION OF THE DRAWINGS

FIG. 1 is a perspective view of the moldboard plow implement of the present invention in assembly relation with a farm tractor;

FIG. 2 is an enlarged side elevational view of one of the plow units of the invention, as seen on line 2—2 in FIG. 1;

FIG. 3 is a top plan view of the moldboard plow implement showing the changed positions of the plow units corresponding to approach angles of thirty five degrees and twenty degrees for the plow bottoms;

FIG. 4 is a diagrammatic showing of the changed positions of the plow bottoms corresponding to the approach angles of thirty-five degrees and twenty degrees, illustrated in FIG. 3;

FIG. 5 is a graph showing the contour of a furrow formed at various plowing speeds;

FIG. 6 is an enlarged detail plan view of the adjustable potentiometer of the automatic control system for monitoring changes in the approach angle of the plow bottoms;

FIG. 7 is an enlarged detail view, partially in section, showing the plow wheel driven generator of the automatic control system;

FIG. 8 is a schemmatic drawing of the hydraulic circuit of the invention; and

DETAILED DESCRIPTION OF THE INVENTION

Figure 9:
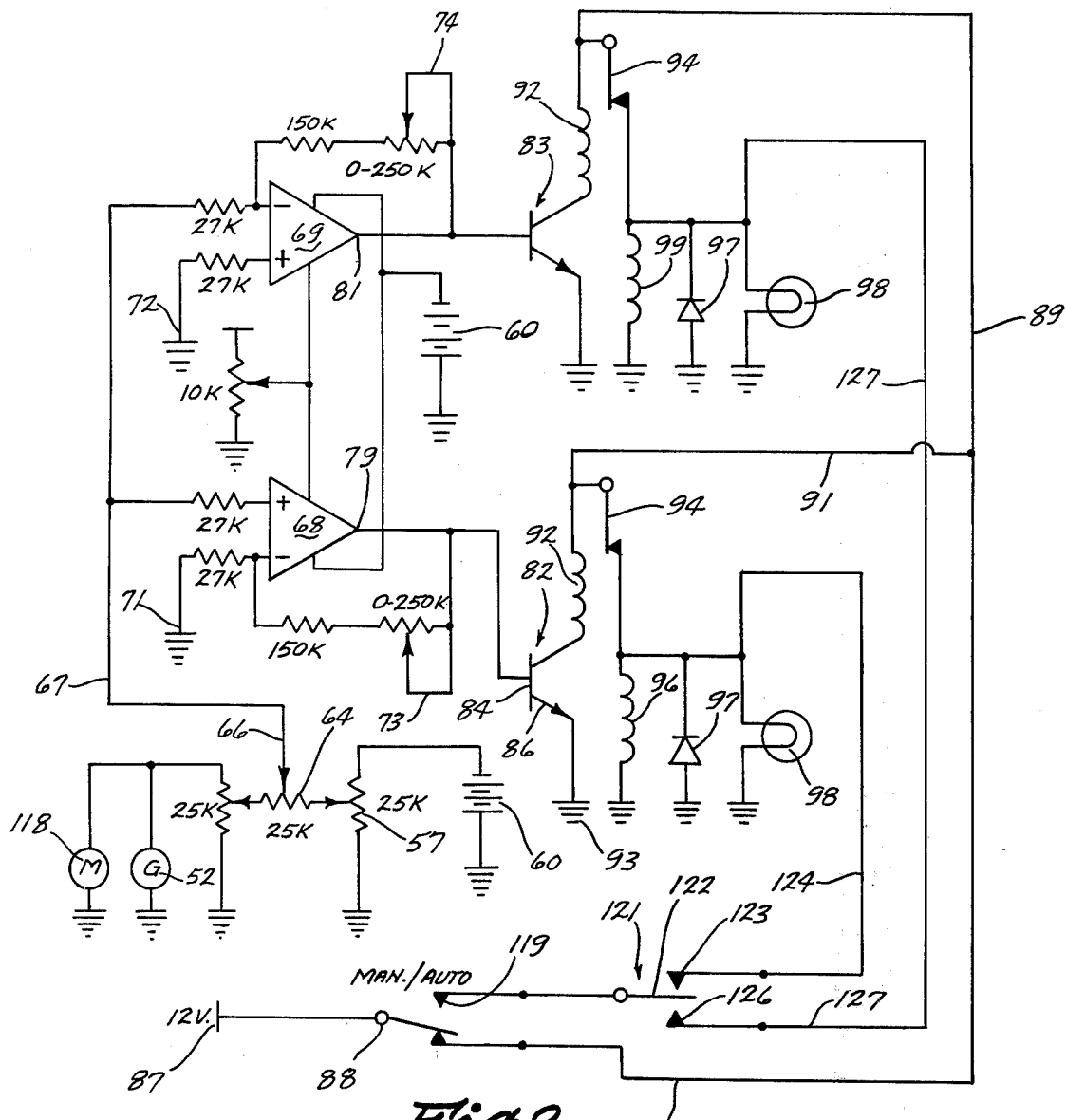
FIG. 9 is a schemmatic drawing of the electrical control circuit of the invention.

The moldboard plow implement of the present invention, indicated generally at 10, is shown in FIG. 1 in assembly relation with a usual farm tractor 11. Implement 10 includes a generally y-shaped frame 12 having an elongated tubular tool bar or main beam 13 with an elongated tongue structure 14 extended forwardly from a medial portion of the beam 13 for connection in a trailing relation with the tractor 11. The forward end of the tongue 14 is adapted for connection to the lift arms 17 of the usual tractor three-point hitch. The rear end of the beam 13 is supported on a transport wheel 18 rotatably connected to the frame by a steerable wheel support mechanism 19 which is vertically adjustable in response to operation of the lift arms 17 to regulate the depth of plowing.

Pivotally supported on the beam 13 at longitudinally spaced positions are a plurality of moldboard plow units 21a, 21b and 21c, respectively, illustrated as three in number. The forward ends of the plow units are pivotally connected to the main beam 13 for lateral pivotal movement of the rear ends thereof. Since all of the plow units are similar in construction and operation, only the forward unit 21a will be described in detail with like numerals referring to like parts of each.

The moldboard plow unit 21a is shown in FIG. 2 as including a plow bottom 22 supported on the lower end of an upright standard 23 which is welded as at 24 to the lower side of a pivotal support frame 26. Support frame 26 includes upper and lower elongated steel plates 27 and 28, respectively, positioned above and below the main beam 13, also respectively, and pivoted at their forward ends on an upright pivot shaft 29 extended through a support bracket 31 (FIGS. 1 and 2) on the front of the beam 13. The opposite rear ends of the plates 27 and 28, respectively, are pivotally interconnected by a linkage 32 and securing bolts 33 for concurrent pivotal movement.

Plow standard 23 has an upper portion 34 projected forwardly of the pivot shaft 29 for pivotally supporting the fork 36 of a disc coulter 37. Note that the axle 38 for the coulter 37 is positioned directly above the front point 39 of the plow bottom 22. It will also be seen in FIG. 2 that the vertical pivot axis, indicated at 40, extends through the pivot shaft 29 and the plow point 39 for a purpose described below.

Because each of the moldboard plow units 21a, 21b and 21c are interconnected by the linkage 32, they are pivotally movable in unison from their solid line positions shown in FIG. 3 to their dotted line positions shown in the same figure. To effect this pivotal movement of the plow units, there is provided a hydraulic ram 41 having one end pivotally connected to a support bracket 42 on the rear face of the beam 13 at a position adjacent the unit 22a and the opposite end pivotally connected to the bolt 33 through the rear end of plow unit 21a. Thus, an operator need only actuate ram 41 to simultaneously adjust the pivotal positions of the plow units relative to the beam 13.

FIG. 4 illustrates diagrammatically the position of the plow bottoms 22 when the plow units are pivotally moved to the solid and dotted line positions of FIG. 3. The width of cut, indicated at W in FIG. 4, between the bottoms 22 remains uniform or unchanged for all pivoted positions of the plow bottoms 22. This is because the vertical pivot axis 40 for each plow unit is in vertical alignment with a respective plow point 39, as illustrated by the line 40 in FIG. 2. However, since the bottoms are pivoted about their respective axes 40, their approach angles change relative to the ground being plowed. The approach angle is that angle between the share or cutting edge 43 at the front of a plow bottom and the direction of travel, indicated at 44 in FIG. 4. Thus, the solid line positions of the plow bottoms 22 in FIG. 4 correspond to an approach angle of 35°, indicated by angle a, and the dotted line positions, more aligned with the direction of travel, corresponding to a decreased approach angle of 20°, indicated by angle b.

The structure thus far described for varying the approach angle of the plow bottoms 22 enables this single implement to be readily adapted for use at various plowing speeds under different soil conditions. FIG. 5 illustrates the problem of using a standard fixed plow bottom for other than a predetermined plowing speed of about four miles per hour. When a plow bottom is moved through the soil it forms a furrow having an inner wall 46, a bottom surface 47 and a generally upright outer wall 48 formed by the soil inverted by the plow bottom. If the approach angle remains constant and the plowing speed is increased to 6.2 miles per hour and then to 8 miles per hour, the soil is thrown laterally, to the right in FIG. 5, with greater force thereby producing a wider and flatter furrow as indicated by lines 49 and 51, respectively. Thus, tractor power is wasted by the energy consumed in forming the wider furrows. The increased lateral throwing of the soil with increased speed is caused by an increase in the lateral component of the forces acting on the plow bottom. This lateral component affects the side thrust on the plow, the scouring action of the plow bottom and, as shown in FIG. 5, the type of furrow shape produced. When a constant lateral force on the plow bottom can be maintained, the plow can be operated at high or low speeds while maintaining a uniform scouring action and constant furrow shape, without any substantial increase in draft. This is accomplished by altering the approach angle of the plow bottoms with the above described structure of the present invention. By visually observing the shape of the furrows, the plow operator can manually actuate ram 41 to increase or decrease the approach angle in response to plow speed variations to obtain the desired furrow space.

To relieve the operator from continually varying the approach angle by visual observation of the furrow, an automatic control mechanism is provided to automatically vary the approach angle in response to the plowing speed. In FIG. 7, there is shown a generator 52 of the DC type supported on the stationary wheel support shaft 55 adjacent the transport wheel 18. A gear 53 on the generator shaft 54 is positioned in meshed relation with a gear 56 on the hub of the transport wheel 18. The generator 52, driven by the transport wheel 18, thus generates a voltage proportional to the plowing speed.

The approach angle of the plow bottoms 22 is electrically monitored by a potentiometer 57 shown in FIGS. 3 and 6. A housing 58 for potentiometer 57 is pivotally supported on the main beam 13 intermediate the plow units 21a and 21b. An elongated gear rack 59 is pivotally connected at one end on a rear portion of the upper plate 27 of the forward plow unit 21a as at 61 and is slidably received at its other end within the potentiometer housing 58 is meshed relation with a gear 62 on the potentiometer armature 63. Thus, pivotal movement of the plow unit 21a effects a linear movement of the rack 59 to rotate the armature 63 of the potentiometer 57. The potentiometer 57 produces a voltage signal which is inversely proportional to the approach angle of the plow bottom 22.

Referring to the electrical circuit diagram of FIG. 9, the generator 52 produces a −ve negative voltage relative to ground and the potentiometer 57, which is connected in series with the 12 volt tractor battery 60, produces a +ve positive voltage relative to ground. The generator is of a type to produce a negative voltage in the range of 0 to 12 volts, which is therefore always less than the battery voltage. The negative voltage from the generator 52 and positive voltage from the potentiometer 57 are tied to opposite ends of a potentiometer 64 wherein the signals are algebraically added to produce a differential voltage signal which is then amplified to control one of the solenoids in a double acting hydraulic valve 107 (FIG. 8) for actuating ram 41. Potentiometer 64 has an arm 66 for adjusting the desired approach angle/speed ratio in accordance with the particular soil conditions of a field, as will be described below.

If the approach angle is at the correct setting for a given plowing speed, the negative and positive voltage signals from the generator 52 and potentiometer 57, respectively, will cancel out one another so as to produce no differential voltage in the potentiometer 64. If the plowing speed is varied, however, the positive and negative voltage signals will be unequal, thereby resulting in a differential voltage signal which is transmitted by line 67 (FIG. 9) to the input of a pair of dual operational amplifiers 68 and 69. The amplifiers 68 and 69 are connected to ground, as at 71 and 72, respectively, and each amplifier is provided with a variable feedback circuit 73 and 74, respectively, for the purpose of adjusting the gain of the respective amplifiers. Power for operating the amplifiers is provided by the tractor battery 60 which also serves as the positive voltage source for the potentiometer 57. Although the same differential voltage signal is applied to both amplifiers 68 and 69, the output of each is not the same. Operational amplifier 68 has the same sense on output as on input whereas operational amplifier 69 has the opposite sense on output as on input. Thus, if the differential voltage signal is positive, operational amplifier 68 will go positive and operational amplifier 69 will go negative.

The output terminals 79 and 81 of the operational amplifiers 68 and 69, respectively, are each connected to an npn transistor 82 and 83, respectively. Referring specifically to transistor 82, an npn transistor is turned on if the voltage at the base 84 is greater than that at the emitter 86 which is connected to ground. Thus, transistor 82 will be turned on only when the output of amplifier 68 is positive. When that occurs, transistor 82 completes a solenoid-actuating circuit which originates at a twelve volt power source 87, such as the tractor battery 60, and extends through a single pole double throw switch 88 and lines 89 and 91 to a relay coil 92 and finally through transistor 82 to ground as at 93. Energization of relay coil 92 closes a relay switch 94 to energize a solenoid coil 96 which forms part of the hydraulic valve 107. A suppressor diode 97 is connected across the coil 96 together with a lamp 98 which provides a visual indication that the solenoid coil 96 is energized. It will be seen in FIG. 9 that the above described circuit completed by transistor 82 is duplicated for transistor 83 wherein there is included an opposite solenoid coil 99 and wherein like numbers identify like elements of both circuits.

Thus, if the differential voltage from potentiometer 64 is positive, operational amplifier 68 goes positive, thereby turning on transistor 82 and, subsequently, solenoid 96. If the differential voltage from potentiometer 64 is negative, the output of operational amplifier 69 goes positive turning on transistor 83 and, subsequently, solenoid 99. Hence, there is a separation and control of the two solenoids 96 and 99 that is dependent only on whether the differential voltage signal to the amplifiers 68 and 69 is in the +ve or −ve sence.

The hydraulic control circuit for operating ram 41 is shown in FIG. 8 wherein the pump 101 of the tractor hydraulic system is connected through a manual shutoff valve 102 to a flow control valve 103 which regulates the rate of fluid flow to control the operating speed of the ram 41. The flow control valve 103 is connected by a fluid passage 104 to the inlet port 106 of a directional valve 107 which is operated by the solenoids 96 and 99. Directional valve 107 is connected by fluid passage lines 108 and 109 to opposite ends of a cylinder unit 111 of the ram 41. The outlet port 112 of directional valve 107 is connected by a fluid passage 113 to a manual shutoff valve 114 for connection to the reservoir 115 of the tractor hydraulic system.

Energization of solenoid 99 effects a movement of the directional valve 107 to the right, as seen in FIG. 8, thereby effecting a fluid flow to the right end 116 of cylinder 111, as seen in FIG. 8, to retract ram 41 and thereby decrease the approach angle of the plow units 21a, 22b and 21c. Likewise, energization of solenoid 96 moves the directional valve 107 to the left, as shown in FIG. 8, to effect a fluid flow to the opposite end 117 of cylinder 111 for extension of ram 41 and a resultant increase in the approach angle of the plow units.

In operation, it the operator of the tractor increases the plowing speed, the generator 52 puts out a −ve voltage with respect to ground which is greater than the +ve voltage with respect to ground from the potentiometer 57, resulting in a negative differential voltage signal to the operational amplifiers 68 and 69. Accordingly, the −ve differential voltage actuates operational amplifier 69 and solenoid 99 to effect a retraction of the ram 41 to decrease the approach angle of the plow units. The negative output of operational amplifier 68 fails to actuate transistor 82 and solenoid 96. As the approach angle is decreased by the ram 41, the armature 63 (FIG. 6) of potentiometer 57 is rotated to increase the +ve voltage signal which opposes the −ve voltage signal from the generator 52. When these two signals are equal and opposite, there is no differential voltage signal to the operational amplifiers 68 and 69 and operational amplifier 69 shuts off.

In the same way, a decrease in plowing speed effects actuation of operational amplifier 68, transistor 82 and solenoid 96 to extend ram 41 and thereby increase the approach angle of the plow units. A voltmeter 118 (FIG. 9) may be wired in parallel with the generator 52 and calibrated in miles per hour (mph) to give the operator a visual indication of the plowing speed.

An optional manual control of the solenoids 96 and 99 is provided by the single pole double throw switch 88 illustrated in FIG. 9. If the switch blade is moved into contact with the manual terminal 119, a circuit is completed from the power source 87 to another single pole double throw switch 121 situated in the tractor cab for convenient access by the operator. The switch blade 122 of switch 121 may be moved into contact with terminal 123 to complete a circuit through line 124 directly to the solenoid 96 for extending ram 41. Likewise, switch blade 122 may be moved into contact with terminal 126 to complete a circuit through line 127 directly to the solenoid 99 to retract the ram 41.

Accordingly, certain elements of the electrical circuit of FIG. 9 are situated within the tractor cab for access by the operator, namely, the manual/automatic control switch 88, the manual operating switch 121, potentiometer 64 and the voltmeter 118. The circuits associated with the amplifiers 68 and 69 are situated with the solenoid controlled valve 107 on the tongue 14 as shown in FIGS. 1 and 3. The flow control valve 103 is mounted on the rear face of main beam 13 adjacent the ram 41.

To adjust the automatic control system for plowing in different soil conditions, the manual/automatic control switch 88 (FIG. 8) is moved to its manual position so that on the first pass through a field at a selected plowing speed, the operator can manually adjust the approach angle of the plow units with the manual operating switch 121. By visually observing both the scouring effect on the plow bottoms 22 and the shape of the furrows being formed, the operator can determine the best approach angle for the selected speed. Thereafter, the manual/automatic control switch 88 can be moved to its automatic position so that the approach angle will thereafter be automatically controlled without operator assistance.

The ideal setting of the approach angle for a given speed and soil condition is the minimum angle at which adequate scouring of the plow bottoms occurs. Generally, the higher the adhesion of the soil in relation to the cohesion of the soil, the greater the approach angle must be for scouring of the plow bottoms 22. Accordingly, in soils with higher adhesion characteristics, it is desirable to obtain a greater approach angle at a given speed than would be set for the same speed in soils with less adhesion. Likewise, in a certain soil type where the side force on the plow bottoms increases sharply with speed, a high reduction in the approach angle is needed; while in another soil where the side force is increased only slightly with speed, only a slight decrease in the approach angle is needed.

One embodiment of the present invention was constructed from a three-furrow version of a semi-mounted Allis Chalmers 2000 series plow by eliminating the conventional plow standards and mounting the bottoms on pivotal support frames 28, as shown in FIGS. 1 and 3. The landsides were removed from the individual plow bottoms because, at any angle other than the design angle of 35°, they would not have been parallel to the furrow wall. For a similar reason, the part of the frog structure on the plow bottoms which is parallel to the furrow wall was repositioned at the same height and angle but 4 inches further away from the furrow wall. The transport wheel at the rear of the implement was moved 7 inches nearer the furrow wall to carry the side thrust. An extra tip was welded onto the front side of each share 43 for operation through a range of approach angles. The electrical circuit included number 1458 (dual 741) operational amplifiers, 2N 3055 transistors and standard five percent resistors.

It is evident in FIG. 8 that the ram 41 could alternatively be adapted for uses other than controlling the approach angle of a plow unit. For example, the ram 41 could be operatively connected to a flow control valve of a sprayer unit for adjusting the spray rate or feed rate of such a unit in response to the forward speed of the sprayer unit.

Although the invention has been described with respect to a preferred embodiment thereof, it is to be understood that it is not to be so limited since changes and modifications can be made therein which are within the full intended scope of this invention as defined by the appended claims.

We claim:

1. A variable approach angle moldboard plow implement for forming furrows of a predetermined width including an elongated tool bar connectible to a tractor, comprising:
   (a) a plurality of moldboard plow units, each comprising a plow bottom having a forward point and a pivoted plow bottom support frame, said plow bottom forming an approach angle with the line of travel of said implement,
   (b) means for pivotally connecting said support frames to the tool bar at longitudinally spaced positions for pivotal movement of the plow units about respective pivot axes arranged in vertical alignment with the forward points of the respective plow bottoms,
   (c) means interconnecting adjacent plow units for pivotal movement in unison,
   (d) power means associated with said plow units for pivotally moving said plow units in unison relative to the tool bar and about said respective pivot axes to uniformly adjust the approach angles of the plow bottoms, whereby to maintain constant the width of the furrows formed by said plow units, and
   (e) means responsive to changes in tractor speed for actuating said power means to pivotally move said plow units in unison relative to the tool bar.

2. A moldboard plow implement, according to claim 1, wherein:
   (a) said power means comprises a linearly extendible and retractable hydraulic power unit pivotally connected at one end to a plow unit rearwardly of the pivot axis therefor at the opposite end thereof to the tool bar, and
   (b) said means responsive to changes in tractor speed for actuating said power means including:
      (1) an electrical circuit having
         (a) means for producing a first control signal proportional to the forward speed of the implement,
         (b) means for producing a second control signal proportional to the approach angle of the plow bottoms, and
      (2) a hydraulic control circuit including: (a) a solenoid valve connectible with a source of hydraulic pressure and with opposite ends of the hydraulic power unit,
      (3) said solenoid valve responsive to changes in the first control signal for directing fluid to one end of the hydraulic cylinder unit to pivotally move said plow units to changed positions and responsive to changes in the second control signal to cut off the flow of fluid to said hydraulic cylinder unit to maintain the plow units in said changed positions.

3. A method for uniformly plowing ground with a predetermined furrow width and at varying plowing speeds, comprising the steps of:
   (a) forming furrows with a plurality of plow units,
   (b) pivotally supporting each plow unit for pivotal movement about a vertical pivot axis arranged in alignment with the front point of the plow bottom of the plow unit to vary the approach angle of the plow bottom relative to the line of travel of the plow unit,
   (c) pivotally moving said plow bottoms about the pivot axes therefor to vary the approach angle thereof inversely with the plowing speed, and
   (d) maintaining the width of the furrows formed by the plow units constant as said plow units move along the line of travel thereof.

4. The method for uniformly plowing ground at varying plowing speeds, according to claim 3, including the steps of:
   (a) producing a first signal indicative of the approach angle of the plow bottom,
   (b) producing a second signal indicative of the plowing speed,
   (c) establishing a predetermined proportional relationship between said first and second signals, and
   (d) pivotally moving said plow bottom to adjust said first signal relative to said second signal in accordance with said predetermined proportional relationship.

* * * * *